(12) United States Patent
Yamazaki et al.

(10) Patent No.: US 11,106,353 B1
(45) Date of Patent: Aug. 31, 2021

(54) INFORMATION PROCESSING APPARATUS AND CONTROL METHOD

(71) Applicant: Lenovo (Singapore) Pte. Ltd., Singapore (SG)

(72) Inventors: Mitsuhiro Yamazaki, Kanagawa (JP); Seiichi Kawano, Kanagawa (JP); Yoshitsugu Suzuki, Kanagawa (JP); Ryohta Nomura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/194,951

(22) Filed: Mar. 8, 2021

(30) Foreign Application Priority Data

Apr. 1, 2020 (JP) .............................. JP2020-065985

(51) Int. Cl.
*G06F 3/0488* (2013.01)
*G06F 3/041* (2006.01)
*G06F 3/0484* (2013.01)

(52) U.S. Cl.
CPC ............ *G06F 3/0488* (2013.01); *G06F 3/041* (2013.01); *G06F 3/0484* (2013.01)

(58) Field of Classification Search
CPC ....... G06F 3/0488; G06F 3/041; G06F 3/0484
See application file for complete search history.

(56) References Cited

U.S. PATENT DOCUMENTS

| 2016/0092877 | A1* | 3/2016 | Chew | ................. | G06Q 20/4012 |
| | | | | | 705/72 |
| 2016/0110554 | A1* | 4/2016 | Kang | .................... | G06F 21/606 |
| | | | | | 726/27 |
| 2020/0371734 | A1* | 11/2020 | Kawano | ................ | G06F 1/1683 |

FOREIGN PATENT DOCUMENTS

JP 2015-233198 A 12/2015

* cited by examiner

*Primary Examiner* — Shen Shiau
(74) *Attorney, Agent, or Firm* — Osha Bergman Watanabe & Burton LLP

(57) ABSTRACT

An information processing apparatus includes: a display; a touch sensor on the display that detects a contact with an object on the display; a main system that executes processing in accordance with an operating system (OS); and an embedded system different from and independent of the main system. The embedded system causes the display to display third image data obtained by synthesizing first image data output from the main system and second image data that is image data in an input area for a virtual input device, and to output input information based on detection information detected by the touch sensor in the input area to the main system as input information accepted by the virtual input device.

8 Claims, 11 Drawing Sheets

INFORMATION PROCESSING APPARATUS AND CONTROL METHOD

TECHNICAL FIELD

The present invention relates to an information processing apparatus and a control method.

BACKGROUND

Recently known information processing apparatuses such as laptop type personal computers (hereinafter referred to as laptop PCs) include a display screen that can operate as a virtual input device such as a software keyboard.

Information processing apparatuses achieving a multiple display environment also has been proposed, which allows a user of the device to use a plurality of displays.

[Patent Document 1] Japanese Unexamined Patent Application Publication No. 2015-233198

Such typical implementation of a virtual input device with software, however, may cause the security and privacy risk, as in the case where another software reads the input to the virtual input device. To avoid this risk, a virtual input device is typically implemented with software to be a tool associated with an OS (operating system) such as Windows (registered trademark), and another unique way of implementing a virtual input device is not allowed in most cases. Such restrictions on the OS make it difficult for conventional information processing apparatuses to implement a virtual input device with a high degree of freedom.

SUMMARY

One or more embodiments of the present invention provide an information processing apparatus and a control method capable of implementing a virtual input device with a high degree of freedom while protecting privacy.

An information processing apparatus according to the first aspect of the present invention includes: a display unit; a touch sensor unit placed on the display unit and configured to detect a contact with an object on the display unit; a main system configured to execute processing in accordance with an operating system (OS); and an embedded system that is different from and independent of the main system, and is configured to make the display unit display third image data, which is obtained by synthesizing first image data output from the main system and second image data that is image data in an input area for a virtual input device, and to also output input information based on detection information detected by the touch sensor unit in the input area to the main system as input information accepted by the virtual input device.

In the information processing apparatus according to one aspect of the present invention, the embedded system may synthesize the second image data with the first image data in a partial area to create the third image data.

In the information processing apparatus according to one aspect of the present invention, the embedded system may synthesize the first image data with the second image data in a partial area to create the third image data.

In the information processing apparatus according to one aspect of the present invention, the embedded system may execute a process of synthesizing the second image data with the first image data in a partial area and a process of synthesizing the first image data with the second image data in a partial area while switching between the processes.

In the information processing apparatus according to one aspect of the present invention, when the touch sensor unit receives a predetermined operation, the embedded system may change the display unit from a state of displaying the first image data to a state of displaying the third image data.

In the information processing apparatus according to one aspect of the present invention, the display unit may include a first display area to display one of the first image data and the third image data, and a second display area to directly receive image data output from the main system and display the received image data.

The information processing apparatus according to one aspect of the present invention may further include a switching unit configured to change a path between a first path that outputs the first image data from the main system to the display unit without passing through the embedded system and a second path that lets the first image data from the main system pass through the embedded system and outputs the third image data from the embedded system to the display unit. The embedded system may control the switching unit to change the path from the first path to the second path to let the display unit displays the third image data.

In the information processing apparatus according to one aspect of the present invention, when a distance between color of the first image data and color of the second image data in color space is within a predetermined threshold, the embedded system may change the color of the second image data to create the third image data so that the second image data becomes visible.

A method for controlling an information processing apparatus according to the second aspect of the present invention and controls the information processing apparatus including: a display unit; a touch sensor unit placed on the display unit and configured to detect a contact with an object on the display unit; a main system configured to execute processing in accordance with an operating system (OS); and an embedded system that is different from and independent of the main system. The method controlled by the embedded system includes: displaying third image data, which is obtained by synthesizing first image data output from the main system and second image data that is image data in an input area for a virtual input device, on the display unit; and outputting input information based on detection information, which is detected by the touch sensor unit in the input area, to the main system as input information accepted by the virtual input device.

The above-described aspects of present invention provide a virtual input device with a high degree of freedom while protecting the privacy.

DETAILED DESCRIPTION

Figure 1:
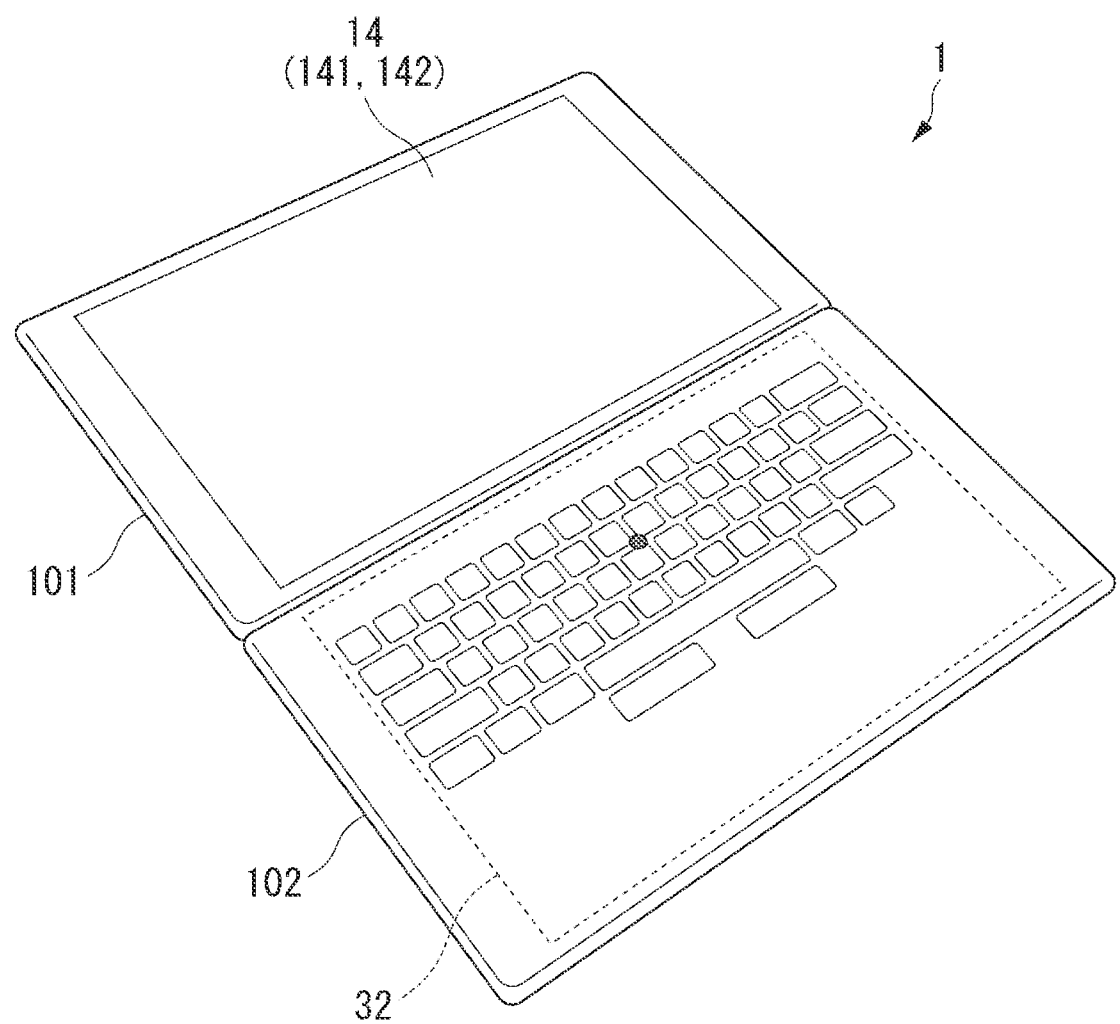
FIG. 1 illustrates the appearance of one example of a laptop PC according to a first embodiment.

Referring to the drawings, the following describes an information processing apparatus and a control method according to one embodiment of the present invention.

First Embodiment

FIG. 1 illustrates the appearance of one example of a laptop PC 1 according to a first embodiment. The following describes the present embodiment by way of the laptop PC 1 as one example of the information processing apparatus.

As illustrated in FIG. 1, the laptop PC 1 includes a first chassis 101 and a second chassis 102. One side face of one of the chassis (the first chassis 101) engages with one side face of the other chassis (the second chassis 102) via a hinge mechanism, so that the first chassis 101 is rotatable around the rotary shaft of the hinge mechanism relative to the second chassis 102.

The laptop PC 1 includes a touch screen 14 and an input unit 32. The touch screen 14 is placed in the first housing 101 and functions as a main display unit. The touch screen 14 includes a display unit 141 and a touch sensor unit 142.

In one example, the input unit 32 includes a keyboard or a pointing device, and is placed in the second chassis 102.

Figure 2:
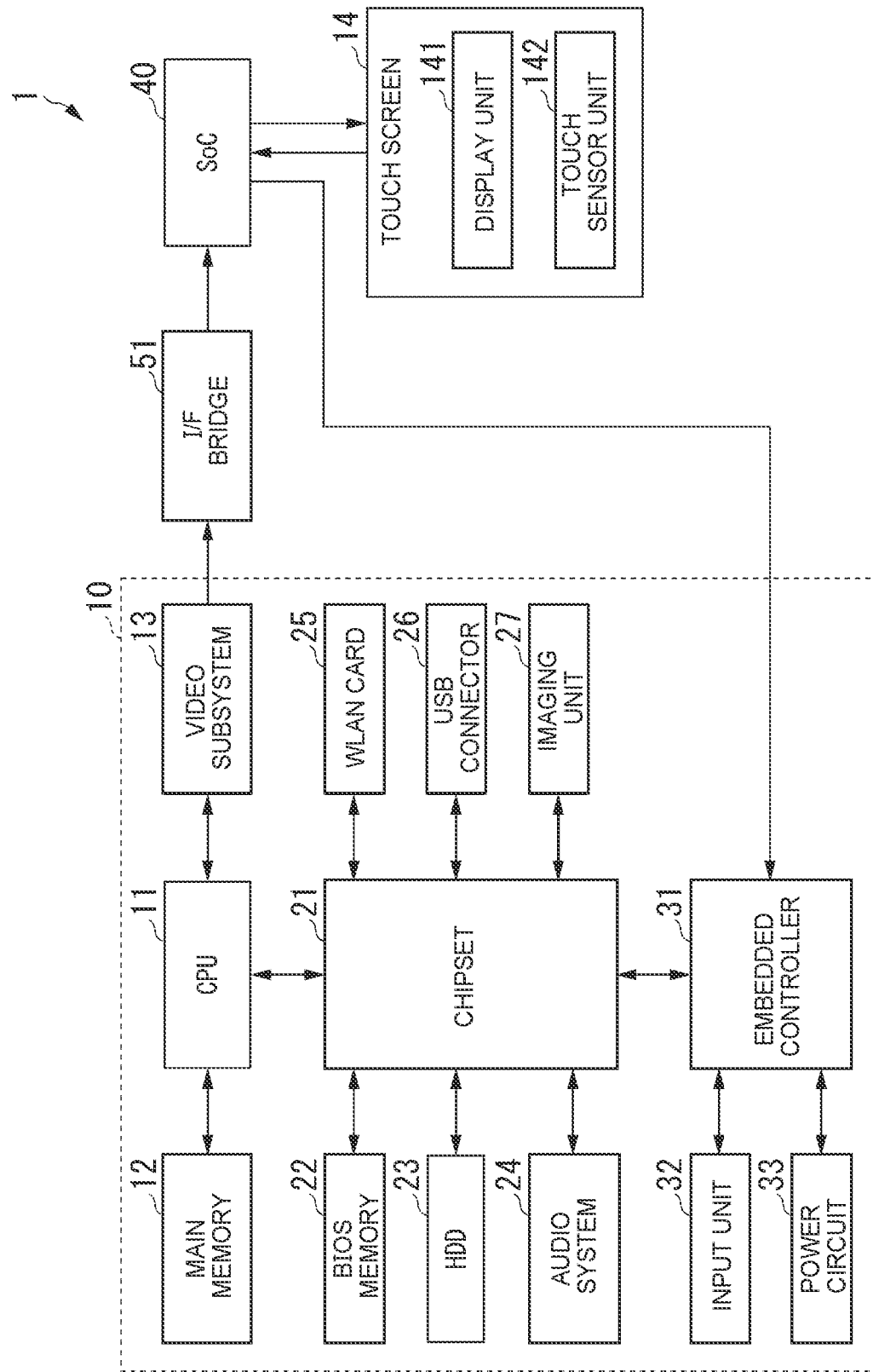
FIG. 2 illustrates one example of a major hardware configuration of the laptop PC according to the first embodiment.

FIG. 2 illustrates one example of a major hardware configuration of the laptop PC 1 according to the present embodiment.

As illustrated in FIG. 2, the laptop PC 1 includes a central processing unit (CPU) 11, a main memory 12, a video subsystem 13, the touch screen 14, a chipset 21, a basic input output system (BIOS) memory 22, a hard disk drive (HDD) 23, an audio system 24, a wireless local area network (WLAN) card 25, a universal serial bus (USB) connector 26, an imaging unit 27, an embedded controller 31, the input unit 32, a power circuit 33, a system-on-a-chip (SoC) 40, and an interface (I/F) bridge 51.

In the present embodiment, the CPU 11, the main memory 12, the video subsystem 13, the chipset 21, the BIOS memory 22, the HDD 23, the audio system 24, the WLAN card 25, the USB connector 26, the imaging unit 27, the embedded controller 31, the input unit 32, and the power circuit 33 correspond to a main system 10 that executes the processing in accordance with the OS (operating system).

In one example, the main system 10 executes various types of processing in accordance with Windows (registered trademark).

The CPU 11 executes various types of arithmetic processing under the control of programs to control the laptop PC 1 as a whole.

The main memory 12 is a writable memory functioning as a read-in area of a program executed by the CPU 11 or a work area to write the data processed by the executed program. In one example, the main memory 12 includes a plurality of dynamic random access memory (DRAM) chips. The programs executed include an OS, various types of drivers to operate peripherals as hardware, various types of service/utility, and application programs.

The video subsystem 13 is to implement the functions related to image displaying, and includes a video controller. This video controller processes a drawing instruction from the CPU 11 and writes the processed drawing information on a video memory. The video controller also reads this drawing information from the video memory and outputs the drawing information as drawing data (image data) to the display unit 141. In one example, the video subsystem 13 outputs data with high-definition multimedia interface (HDMI) (registered trademark).

The chipset 21 includes a controller such as for USB, serial AT attachment (ATA), serial peripheral interface (SPI) bus, peripheral component interconnect (PCI) bus, PCI-express bus, or low pin count (LPC) bus, and a plurality of devices connects to the chipset 21. FIG. 2 illustrates examples of the devices connected to the chipset 21, including the BIOS memory 22, the HDD 23, the audio system 24, the WLAN card 25, the USB connector 26, and the imaging unit 27.

In one example, the BIOS memory 22 includes a non-volatile memory that is electrically rewritable, such as an electrically erasable programmable read only memory (EEPROM) or a flash ROM. The BIOS memory 22 stores BIOS and system firmware to control the embedded controller 31 or the like.

The HDD 23 is one example of a non-volatile memory, and stores an OS, various types of drivers, various types of services/utilities, application programs, and various types of data.

The audio system 24 records, reproduces, and outputs audio data.

The WLAN card 25 connects to a network via wireless LAN for data communication. When receiving data from the network, for example, the WLAN card 25 generates an event trigger indicating the data reception.

The USB connector 26 is to connect peripherals using USB.

In one example, the imaging unit 27 is a Web camera, and takes an image. In one example, the imaging unit 27 connects to the chipset 21 with the USB interface.

The embedded controller 31 is a one-chip microcomputer to monitor and control various devices (e.g., peripherals and sensors), irrespective of the system state of the laptop PC 1. The embedded controller 31 also has a power-management function to control the power circuit 33. The embedded controller 31 includes a CPU, a ROM, and a RAM, which are not illustrated, and has an A/D input terminal, a D/A output terminal, a timer, and a digital input/output terminal for a plurality of channels. The embedded controller 31 connects to components including the input unit 32 and the power circuit 33 via these input/output terminals, and the embedded controller 31 controls the operation of these components.

The input unit 32 includes various types of input devices, including a keyboard, a pointing device, and a touch pad.

The power circuit 33 includes a DC/DC converter, a discharge/charge unit, a battery unit, and an AC/DC adaptor, and converts DC voltage supplied from the AC/DC adaptor or the battery unit to a plurality of levels of voltage required to operate the laptop PC 1. The power circuit 33 supplies electricity to various parts of the laptop PC 1 under the control of the embedded controller 31.

In one example, the SoC 40 is a processor including a CPU, and is implemented by executing built-in firmware to function as an independent embedded system different from the main system 10. In one example, the SoC 40 controls a virtual input device such as a software keyboard. The SoC 40 synthesizes output image data (first image data), which is the image data output from the main system 10, and input image data (second image data), which is the image data in the input area for the virtual input device. The SoC 40 then controls the display unit 141 to display the synthesized image data (third image data). The SoC 40 also outputs the input information based on detection information detected by the touch sensor unit 142 in the input area of the virtual input device to the main system 10 (e.g., the embedded controller 31) as the input information received by the virtual input device. The details of the SoC 40 are described later with reference to FIG. 3.

The I/F bridge 51 converts the interface of image data from HDMI (registered trademark) to mobile industry processor interface-camera serial interface (MIPI-CSI). That is, the I/F bridge 51 converts the image data output from the main system 10 from HDMI (registered trademark) to MIPI-CSI and outputs it to the SoC 40.

As illustrated in FIG. 1, the touch screen 14 is placed in the first chassis 101, and includes the display unit 141 and the touch sensor unit 142.

In one example, the display unit 141 is a liquid crystal display or an organic EL display, and displays image data on the screen.

The touch sensor unit 142 is overlaid on the screen of the display unit 141, and detects a contact with an object (including a part of a human body) on the screen of the display unit 141. The touch sensor unit 142 outputs contact position information indicating the contact position in the detection area on the screen to the SoC 40.

Figure 3:
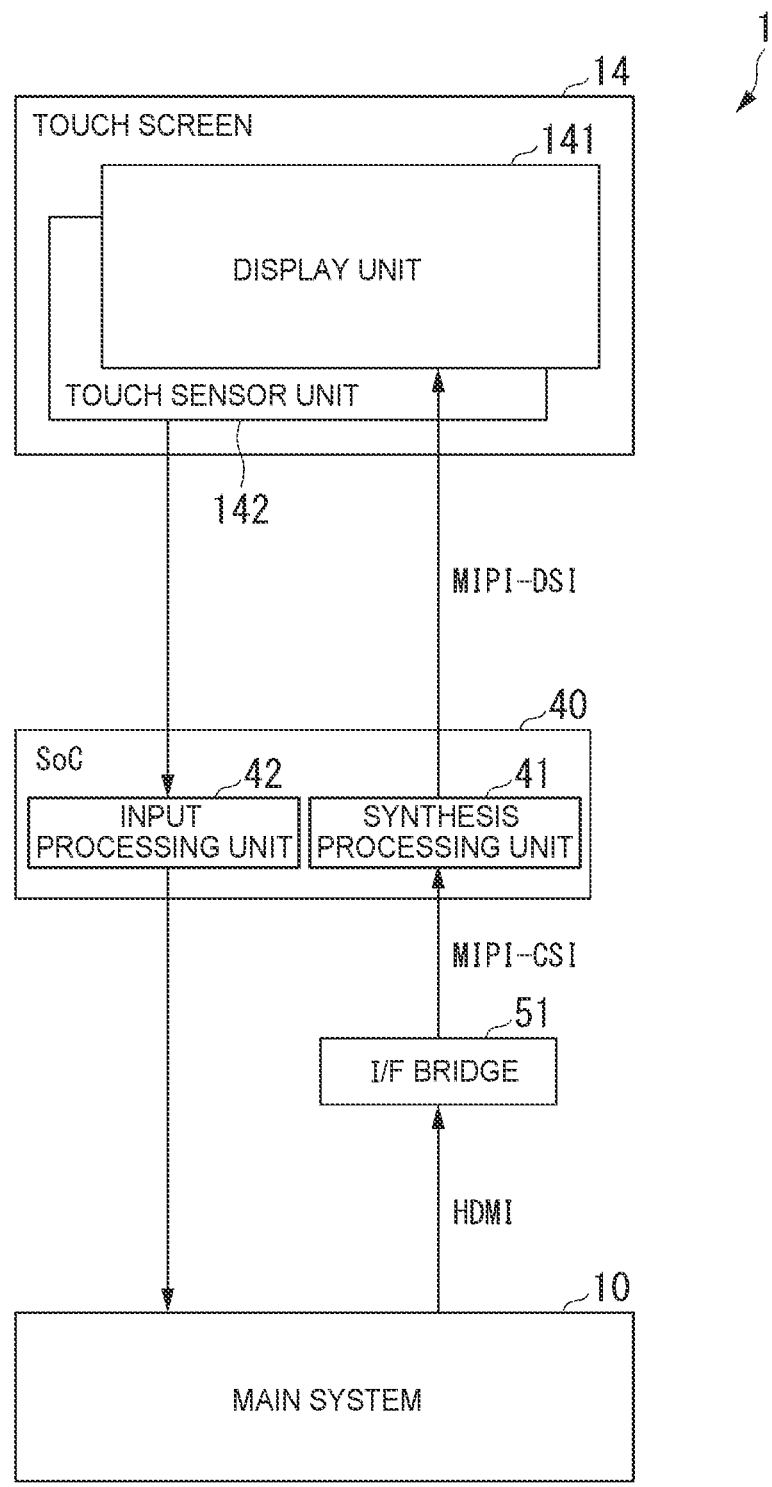
FIG. 3 is a block diagram illustrating one example of the functional configuration of the laptop PC according to the first embodiment.

Referring next to FIG. 3, the following describes the functional configuration of the laptop PC 1 according to the present embodiment.

FIG. 3 is a block diagram illustrating one example of the functional configuration of the laptop PC 1 according to the present embodiment.

As illustrated in FIG. 3, the laptop PC 1 includes the main system 10, the touch screen 14, the SoC 40, and the I/F bridge 51. FIG. 3 illustrates only the major functional configuration of the laptop PC 1 that relates to the invention of the present embodiment.

In one example, the SoC 40 includes a synthesis processing unit 41 and an input processing unit 42.

The synthesis processing unit 41 acquires the output image data output from the main system 10 with MIPI-CSI via the I/F bridge 51, and synthesizes this output image data with the input image data for the virtual input device to create synthesized image data.

In the following description, the image data output from the main system 10 will be described as output image data, and the display image data in the input area for the virtual input device will be described as input image data. The following assumes the case where the SoC 40 creates the input image data based on the image data stored beforehand in a not-illustrated memory unit of the SoC 40.

In one example, the synthesis processing unit 41 synthesizes the input image data with the output image data in a partial area to create the synthesized image data. That is, the synthesis processing unit 41 overlays the input image data on the output image data as the background to create the synthesized image data. In one example, the synthesis processing unit 41 creates this synthesized image data when the touch sensor unit 142 receives a predetermined operation to activate the virtual input device. Examples of this predetermined operation to activate the virtual input device include an operation of tapping the touch sensor unit 142, e.g., tapping multiple times or long-pressing, and of creating a window of the input area with a plurality of fingers.

In one example, the synthesis processing unit 41 outputs the created synthesized image data with mobile industry processor interface-display serial interface (MIPI-DSI) to the display unit 141 to display the synthesized image data on the display unit 141. When the virtual input device is not used or when the touch sensor unit 142 receives a predetermined operation to stop the virtual input device, the synthesis processing unit 41 outputs the output image data output from the main system 10 as it is with MIPI-DSI to the display unit 141 to display the output image data on the display unit 141. Examples of this predetermined operation to stop the virtual input device include an operation of closing the window in the input area.

When the touch sensor unit 142 receives a predetermined operation to activate the virtual input device in this way, the synthesis processing unit 41 changes the display unit 141 from the state of displaying the output image data to the state of displaying the synthesized image data. When the touch sensor unit 142 receives a predetermined operation to stop the virtual input device, the synthesis processing unit 41 changes the display unit 141 from the state of displaying the synthesized image data to the state of displaying the output image data.

The synthesis processing unit 41 may synthesize data by alpha blending to create the synthesized image data. The color of the output image data (background color) may be close to the color of the input image data. In that case, the synthesis processing unit 41 may change the color of the input image data to create synthesized image data so that a viewer can easily view the display on the virtual input device. Specifically when the distance between the color of the output image data and the color of the input image data in the color space is within a predetermined threshold, the synthesis processing unit 41 determines that their colors are close, and changes the color of the input image data to create synthesized image data so that the input image data becomes visible.

In another example, when a difference between the average pixel value of the output image data and the average pixel value of the input image data is within a predetermined threshold, the synthesis processing unit 41 may determine that their colors are close. In another example, the synthesis processing unit 41 may detect the background color of the output image data and change the color of the input image data so that the color of the input image data is different from the background color (so that their colors differ).

The input processing unit 42 acquires detection information detected by the touch sensor unit 142. When the detection is in the input area of the virtual input device, the input processing unit 42 converts the detection information into the input information of the virtual input device, and outputs this input information to the main system 10. The main system 10 deals with this input information of the virtual input device as the input information of an external input device, for example.

When the detection is not in the input area of the virtual input device, the input processing unit 42 outputs the detection information as it is to the main system 10. The main system 10 deals with this detection information as the detection information of the touch sensor unit 142, which is processed under the control of the OS of the main system 10, for example.

The input processing unit 42 determines whether or not a predetermined operation to activate the virtual input device described above has been accepted based on the detection information. When a predetermined operation to activate the virtual input device is accepted, the input processing unit 42 notifies the synthesis processing unit 41 of the acceptance of the predetermined operation to activate the virtual input device. The input processing unit 42 determines whether or not a predetermined operation to stop the virtual input device described above has been accepted based on the detection information. When a predetermined operation to stop the virtual input device is accepted, the input processing unit 42 notifies the synthesis processing unit 41 of the acceptance of the predetermined operation to stop the virtual input device.

Referring next to the drawings, the following describes the operation of the laptop PC 1 according to the present embodiment.

Figure 4:
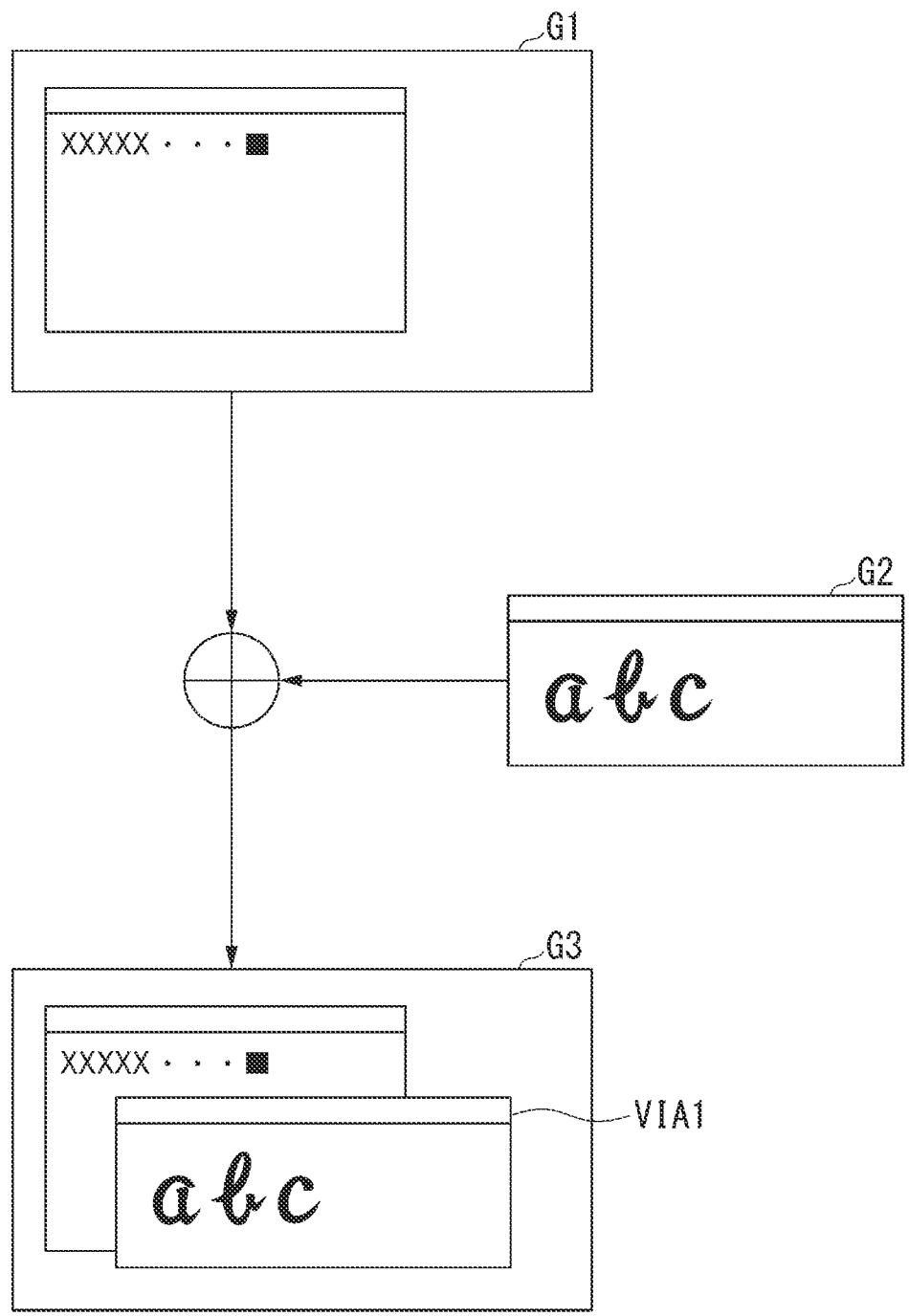
FIG. 4 illustrates one example of the display synthesizing on the virtual input device according to the first embodiment.

Referring to FIGS. 3 and 4, the operation when the virtual input device is used in this laptop PC 1 is described first.

As illustrated in FIG. 3, the main system 10 of the laptop PC 1 outputs the image data to be displayed on the display unit 141 as the output image data to the I/F bridge 51 with HDMI (registered trademark) in the typical processing. The I/F bridge 51 converts the received output image data into MIPI-CSI, which is an interface to transmit image data for camera, and outputs it to the SoC 40.

Next, when the virtual input device is used, the synthesis processing unit 41 of the SoC 40 synthesizes the output image data output from the main system 10 and the input image data of the virtual input device to create synthesized image data.

FIG. 4 illustrates one example of the display synthesizing on the virtual input device according to the present embodiment.

As illustrated in FIG. 4, the synthesis processing unit 41 overlays the input image data like image G2 on a partial area of the output image data like image G1, for example, to create synthesized image data like image G3. In image G3, the display area of image G2 functions as the input area VIA1 of the virtual input device. The virtual input device illustrated in FIG. 4 is an example of an input device for handwrite inputting.

Referring back to FIG. 3, the synthesis processing unit 41 outputs the synthesized image data (e.g., image G3 in FIG. 4) to the display unit 141 with MIPI-DSI that is an interface for display.

In one example, the display unit 141 displays a synthesized image like image G3 in FIG. 4 based on the synthesized image data received from the SoC 40.

In one example, the touch sensor unit 142 detects an operation with the input area VIA1 in image G3 of FIG. 4. In this case, the input processing unit 42 of the SoC 40 converts the detection information detected by the touch sensor unit 142 into input information of the virtual input device and outputs this input information to the main system 10.

In one example, the main system 10 receives this input information of the virtual input device as input information of an external input device, and executes various types of processing in accordance with the input information.

In the example illustrated in FIG. 4, the input area VIA1 for handwrite inputting is overlaid on image G1 that displays the window of an application for inputting characters, such as Notepad. The virtual input device in the input area VIA1 uses the recognized handwritten characters string ("abc" in FIG. 4) to input these characters to an application for character inputting, such as Notepad, in the foreground of the main system 10.

Figure 5:
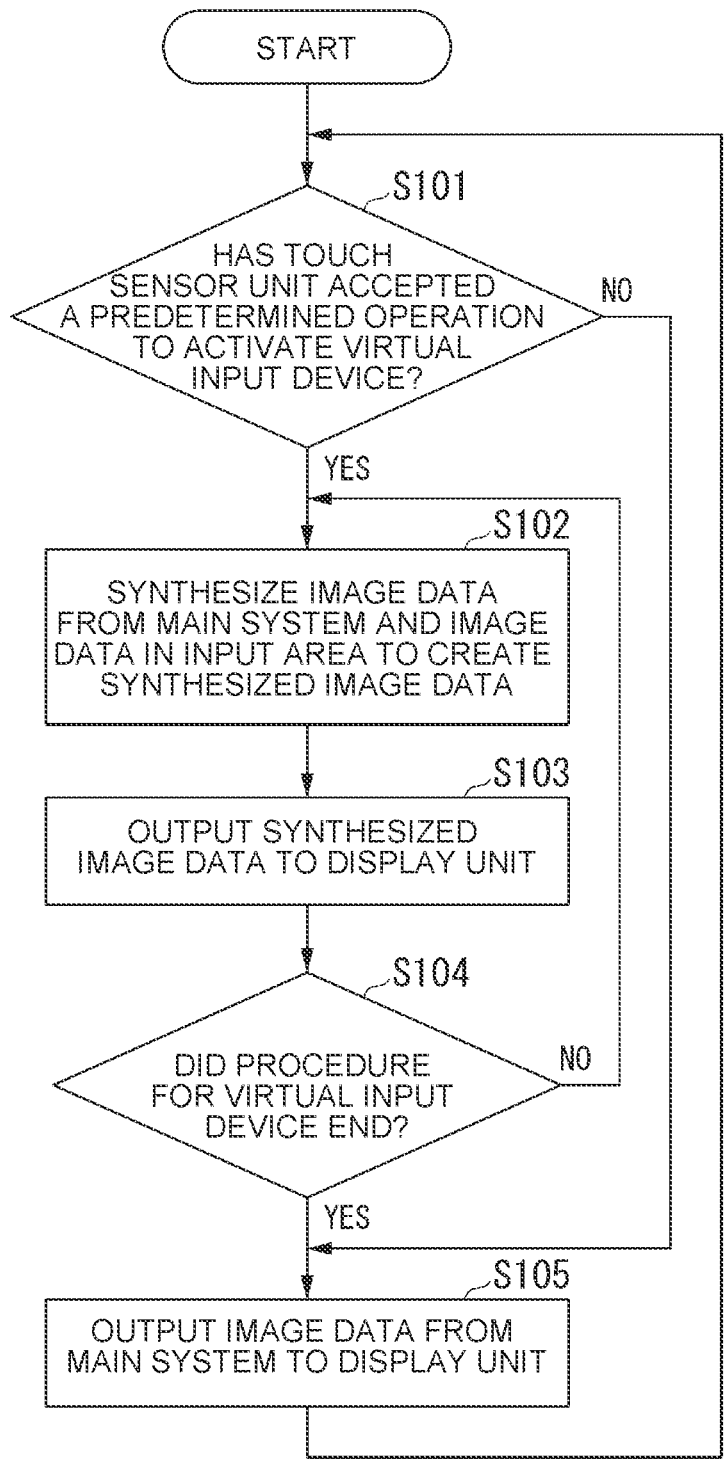
FIG. 5 is a flowchart illustrating one example of the synthesizing by the SoC in the first embodiment.

Referring next to FIG. 5, the following describes the details of the synthesizing at the SoC 40.

FIG. 5 is a flowchart illustrating an example of the synthesizing by the SoC 40 in the present embodiment.

As illustrated in FIG. 5, the SoC 40 first determines whether or not the touch sensor unit 142 has accepted a predetermined operation to activate the virtual input device (step S101). Specifically the input processing unit 42 of the SoC 40 acquires detection information from the touch sensor unit 142 and determines whether or not a predetermined operation to activate the virtual input device has been accepted based on the acquired detection information. When a predetermined operation to activate the virtual input device has been accepted, the input processing unit 42 notifies the synthesis processing unit 41 of the SoC 40 as such. When a notification from the input processing unit 42 tells that a predetermined operation to activate the virtual input device has been accepted (step S101: YES), the synthesis processing unit 41 progresses the procedure to step S102. When no predetermined operation to activate the virtual input device has been accepted (step S101: NO), the synthesis processing unit 41 progresses the procedure to step S105.

In step S102, the synthesis processing unit 41 synthesizes the image data (output image data) from the main system 10 and the image data (input image data) in the input area to create synthesized image data. In one example, the synthesis processing unit 41 creates synthesized image data like image G3 in FIG. 4 as described above.

Next, the synthesis processing unit 41 outputs the synthesized image data to the display unit 141 (step S103). The synthesis processing unit 41 outputs the created synthesized image data to the display unit 141 with MIPI-DSI.

Next, the synthesis processing unit 41 determines whether the procedure for the virtual input device ends or not (step S104). To this end, the input processing unit 42 acquires detection information from the touch sensor unit 142 and determines whether or not a predetermined operation to stop the virtual input device has been accepted based on the acquired detection information. When a predetermined operation to stop the virtual input device has been accepted, the input processing unit 42 notifies the synthesis processing unit 41 of the SoC 40 as such. In response to the notification from the input processing unit 42, the synthesis processing unit 41 determines whether or not the processing of the virtual input device ends or not. When the procedure for the virtual input device ends (step S104: YES), the synthesis processing unit 41 progresses the procedure to step S105. When the procedure for the virtual input device does not end (step S104: NO), the synthesis processing unit 41 returns the procedure to step S102 and repeats the procedure from step S102 to step S104 until a predetermined operation to stop the virtual input device is accepted.

In step S105, the synthesis processing unit 41 outputs the image data (output image data) from the main system 10 to the display unit 141. The synthesis processing unit 41 outputs the output image data to the display unit 141 with MIPI-DSI. After the processing at step S105, the synthesis processing unit 41 returns the procedure to step S101 and repeats the procedure in step S101 and step S105 until a predetermined operation to activate the virtual input device is accepted.

Figure 6:
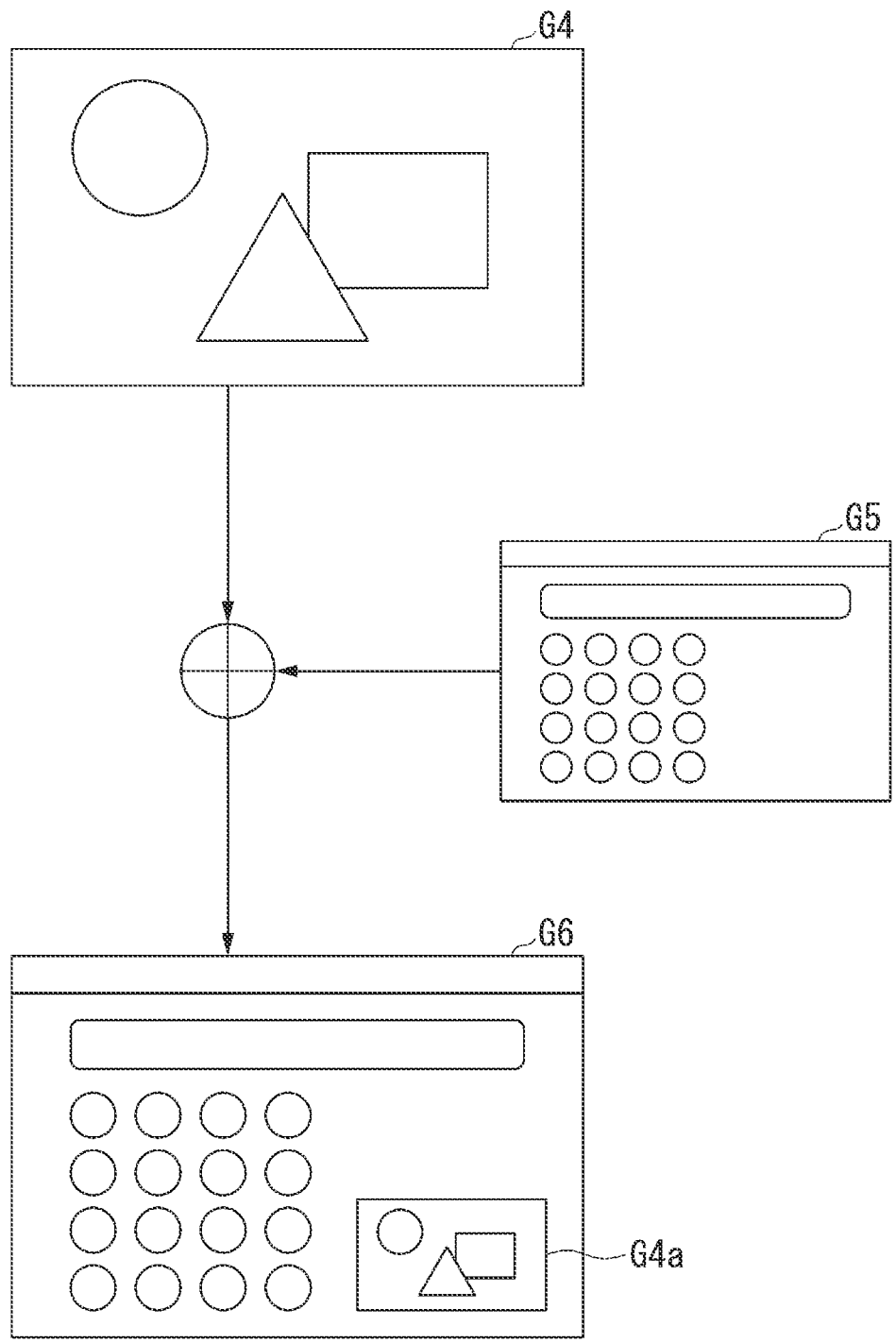
FIG. 6 illustrates a modified example of the display synthesizing on the virtual input device according to the first embodiment.

The above example describes the case where the synthesis processing unit 41 synthesizes the input image data with the output image data in a partial area to create the synthesized image data. In another example, the synthesis processing unit 41 may synthesize the output image data with the input image data in a partial area to create synthesized image data. That is, the synthesis processing unit 41 may overlay the output image data on the input image data as the background to create the synthesized image data. Referring now to FIG. 6, the following describes a modified example of synthesizing output image data with input image data in a partial area to create synthesized image data.

FIG. 6 illustrate a modified example of the display synthesizing on the virtual input device according to the present embodiment.

In one example, as illustrated in FIG. 6, the synthesis processing unit 41 overlays the output image data like image G4 on a partial area of the input image data like image G5 to create synthesized image data like image G6. The entire image of image G6 is the display of the virtual input device. In this case, the display unit 141 displays image G4a, which is a reduced version of image G4, in a partial area of image G6.

The synthesis processing unit 41 may execute the processing of synthesizing the input image data with the output image data in a partial area and the processing of synthesizing the output image data with the input image data in a partial area while switching between them. That is, the synthesis processing unit 41 may execute the synthesis processing illustrated in FIG. 4 and the synthesis processing illustrated in FIG. 6 while appropriately switching between them based on a corresponding predetermined operation that activates the virtual input device.

As described above, the laptop PC 1 (information processing apparatus) according to the present embodiment includes the display unit 141, the touch sensor unit 142, the main system 10, and the SoC 40 (embedded system) that is different from and independent of the main system 10. The touch sensor unit 142 is placed on the display unit 141, and detects a contact with an object on the display unit 141. The main system 10 executes processing in accordance with the OS. The SoC 40 makes the display unit 141 display the synthesized image data (third image data), which is obtained by synthesizing output image data (first image data) output from the main system 10 and input image data (second image data) that is the image data in the input area for the virtual input device. The SoC 40 also outputs the input information based on the detection information detected by the touch sensor unit 142 in the input area of the virtual input device to the main system 10 as the input information accepted by the virtual input device.

With this configuration, the laptop PC 1 according to the present embodiment implements the virtual input device such as a software keyboard through the processing in the independent SoC 40, and so implements a virtual input device with a high degree of freedom without restrictions from the OS (e.g., Windows (registered trademark)) of the main system 10. The SoC 40 is an independent system, and so this configuration reduces the concern that the SoC 40 will be interfered with by other software. That is, there is no concern for the laptop PC 1 according to the present embodiment that the input to the virtual input device will be read, even if the OS of the main system 10 is infected with a computer virus or malware. The laptop PC 1 according to the present embodiment therefore implements a virtual input device with a high degree of freedom while protecting the privacy.

The SoC 40 of the present embodiment synthesizes the input image data with the output image data in a partial area to create synthesized image data.

With this configuration, the laptop PC 1 according to the present embodiment displays any virtual input device in a partial area of the output image data output from the main system 10, and so provides a virtual input device with a higher degree of freedom.

The SoC 40 of the present embodiment may be configured to synthesize the output image data with the input image data in a partial area to create synthesized image data. The SoC 40 may execute the processing of synthesizing the input image data with the output image data in a partial area and the processing of synthesizing the output image data with the input image data in a partial area while switching between them.

With this configuration, the laptop PC 1 according to the present embodiment increases the number of variations of the virtual input device that can be implemented, and so enhances the degree of freedom.

When the distance between the color of the output image data and the color of the input image data in the color space is within a predetermined threshold, the SoC 40 of the present embodiment changes the color of the input image data to create synthesized image data so that the input image data becomes visible. That is, when the color of the output image data is close to the color of the input image data, the SoC 40 changes the color of the input image data to create the synthesized image data.

This allows the laptop PC 1 of the present embodiment to implement a favorable virtual input device that is easily visible in accordance with the color of the output image data.

The laptop PC 1 according to the present embodiment includes the I/F bridge 51 that converts the output image data output from the main system 10 with HDMI (registered trademark) into MIPI-CSI that is a transmission interface to transmit image data for camera, and outputs the data to the SoC 40. The SoC 40 acquires the output image data with MIPI-CSI, and outputs the image data (output image data or synthesized image data) to be displayed on the display unit 141 with MIPI-DSI to the display unit 141.

The SoC 40 of the laptop PC 1 of the present embodiment can be a general SoC product, such as a SoC chip, that is capable of acquiring and processing image data for camera with MIPI-CSI, and so the present embodiment easily implements a unique virtual input device.

A control method according to the present embodiment controls the laptop PC 1 (information processing apparatus) including the display unit 141, the touch sensor 142, the main system 10, and the SoC 40 that is different from and independent of the main system 10 as stated above. The method includes a display processing step and an input processing step. In the display processing step, the SoC 40 synthesizes output image data (first image data), which is the image data output from the main system 10, and input image data (second image data), which is the image data in the input area for the virtual input device, and controls the display unit 141 to display the synthesized image data (third image data). In the input processing step, the SoC 40 outputs the input information based on detection information detected by the touch sensor unit 142 in the input area to the main system 10 as the input information received by the virtual input device.

Such a control method of the present embodiment has the same advantageous effects from those of the laptop PC 1 as stated above, and so implements a virtual input device with a high degree of freedom while protecting the privacy.

Second Embodiment

Referring next to the drawings, the following describes a laptop PC 1*a* according to a second embodiment.

Figure 7:
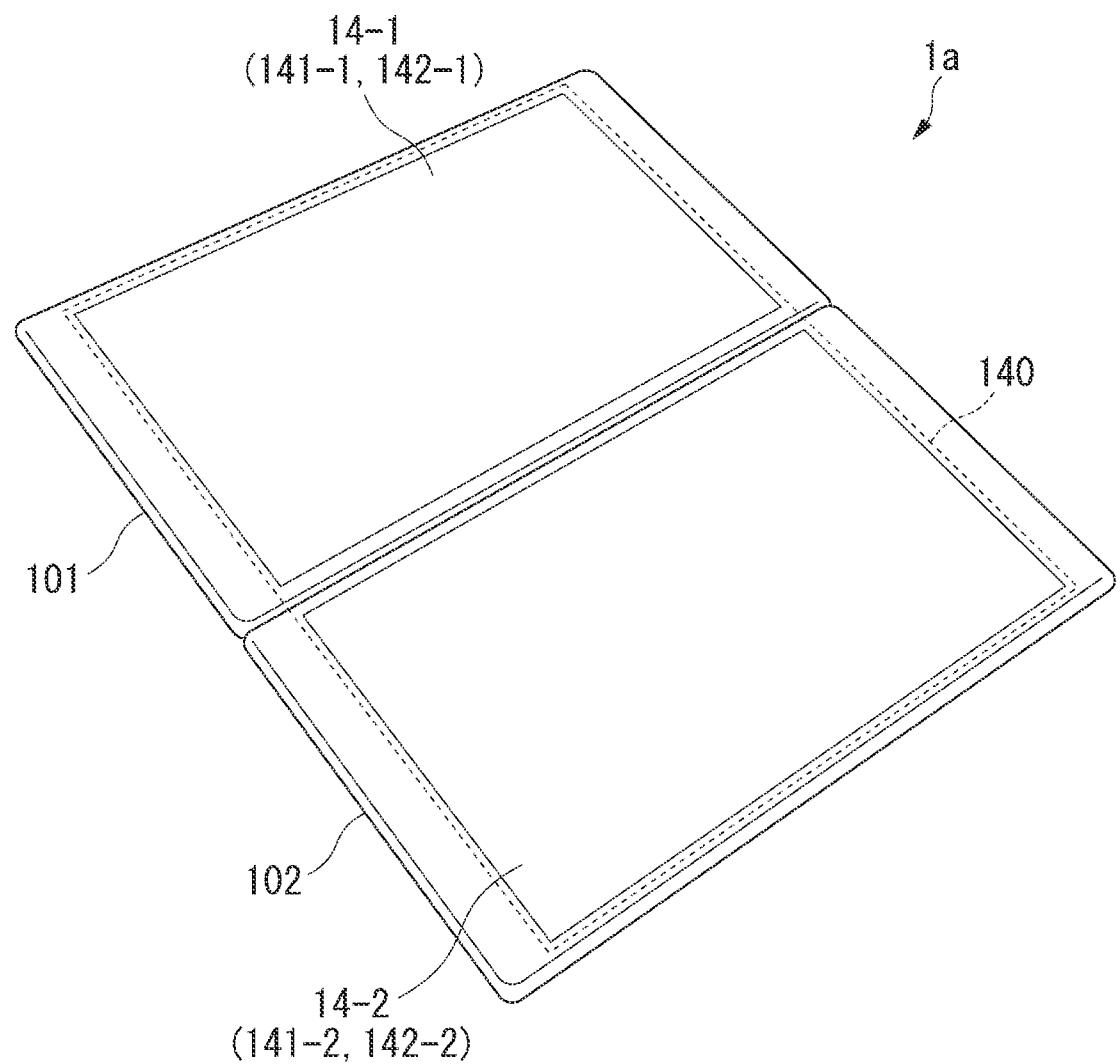
FIG. 7 illustrates the appearance of one example of a laptop PC according to a second embodiment.

FIG. 7 illustrates the appearance of one example of the laptop PC 1*a* according to the second embodiment. The following describes the present embodiment by way of the laptop PC 1*a* as one example of the information processing apparatus.

As illustrated in FIG. 7, the laptop PC 1*a* includes a first chassis 101 and a second chassis 102. One side face of one of the chassis (the first chassis 101) engages with one side face of the other chassis (the second chassis 102) via a hinge mechanism, so that the first chassis 101 is rotatable around the rotary shaft of the hinge mechanism relative to the second chassis 102. The present embodiment describes a modified example having the first chassis 101 and the second chassis 102, each of which has a touch screen 14 (14-1, 14-2).

The laptop PC 1*a* includes two touch screens 14 (14-1 and 14-2). The touch screen 14-1 is placed in the first housing 101 and functions as a main display unit. The touch screen 14-1 includes a display unit 141-1 and a touch sensor unit 142-1.

The touch screen 14-2 is placed in the second housing 102, and includes a display unit 141-2 and a touch sensor unit 142-2.

The touch screen 14-1 and the touch screen 14-2 have the same configuration. The following describes them as the touch screen 14 to indicate any touch screen of the laptop PC 1*a* or when they are not particularly distinguished.

The display unit 141-1 and the display unit 141-2 have the same configuration as the display unit 141 described above, and so the description thereon will be omitted. The touch sensor unit 142-1 and the touch sensor unit 142-2 have the same configuration as the touch sensor unit 142 described above, and so the description thereon will be omitted.

The present embodiment is capable of dealing with the display unit 141-1 and the display unit 141-2 as one display unit 140. In the display unit 140, the display unit 141-1 may be a first display area and the display unit 141-2 may be a second display area.

Figure 8:
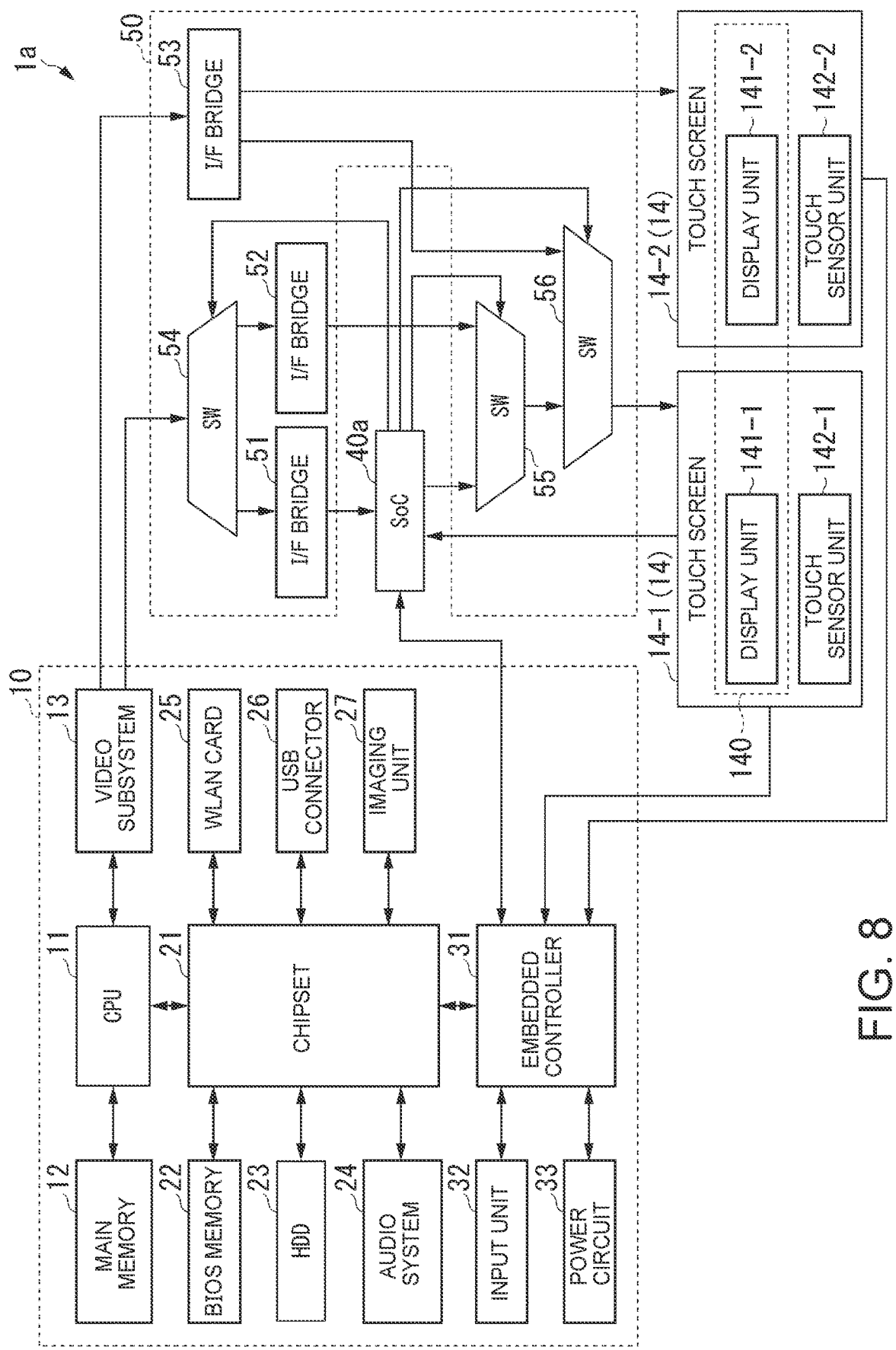
FIG. 8 illustrates one example of a major hardware configuration of the laptop PC according to the second embodiment.

FIG. 8 illustrates one example of a major hardware configuration of the laptop PC 1*a* according to the present embodiment.

As illustrated in FIG. 8, the laptop PC 1*a* includes a CPU 11, a main memory 12, a video subsystem 13, the two touch screens 14 (14-1 and 14-2), a chipset 21, a BIOS memory 22, a HDD 23, an audio system 24, a WLAN card 25, a USB connector 26, an imaging unit 27, an embedded controller 31, an input unit 32, a power circuit 33, a SoC 40*a*, and a switching unit 50.

In FIG. 8, like numerals indicate like components in FIG. 2 as described above, and their description will be omitted.

The switching unit 50 changes the way of displaying the output image data output from the main system 10 on the two display units 141 (141-1 and 141-2) under the control of the SoC 40*a*. In one example, the switching unit 50 includes I/F bridges 51 to 53 and switches 54 to 56.

Similarly to the above first embodiment, the I/F bridge 51 converts the interface of image data from HDMI (registered trademark) to MIPI-CSI. The I/F bridge 51 converts the output image data, which is output from the main system 10 via the switch 54, into MIPI-CSI and outputs it to the SoC 40*a*.

The I/F bridge 52 converts the interface of image data from HDMI (registered trademark) to MIPI-DSI. The I/F bridge 52 converts the output image data, which is output from the main system 10 via the switch 54, into MIPI-DSI and outputs it to the switch 55.

The I/F bridge 53 converts the interface of image data from HDMI (registered trademark) to MIPI-DSI. The I/F bridge 53 converts the output image data, which is output from the main system 10, into MIPI-DSI, and outputs it to both of the display unit 141-2 and the switch 56.

The switch 54 outputs the output image data from the main system 10 to one of the I/F bridge 51 and the I/F bridge 52, and this outputting is under the control of the SoC 40*a*.

The switch 55 receives one of the output image data from the switch 54 and the synthesized image data from the SoC 40*a* to output it to the display unit 141-1 via the switch 56. The inputting to the switch 55 is switched under the control of the SoC 40*a*.

In this way the switch 54 and the switch 55 change the path of the output image data from the main system 10 between the first path and the second path. The first path outputs the output image data to the display unit 141-1 without passing through the SoC 40*a*, and the second path lets the output image data pass through the SoC 40*a* and outputs the output image data from the SoC 40*a* to the display unit 141-1.

The switch 56 receives, as input, one of the output image data from the I/F bridge 53 and the image data from the switch 55 (output image data or synthesized image data), and outputs it to the display unit 141-1. The inputting to the switch 56 is switched under the control of the SoC 40*a*.

In one example, the SoC 40*a* (one example of the embedded system) is a processor including a CPU, and is implemented by executing built-in firmware. The basic functions of the SoC 40*a* are the same as those of the SoC 40 of the first embodiment described above, and the SoC 40*a* has an additional function of controlling the switching of the switching unit 50.

In one example, when the display unit 141-1 displays the synthesized image data, the SoC 40*a* controls to change the path of the switching unit 50 (the switch 54 and the switch 55) from the first path to the second path. In one example, when the virtual input device is not used, the SoC 40*a* changes the path of the switching unit 50 (the switch 54 and the switch 55) from the second path to the first path.

The SoC 40*a* controls the display unit 141-1 to display one of the image data output from the I/F bridge 53 and the image data output from the switch 55. To this end, the SoC 40*a* controls to change the path in the switching unit 50 (switch 56). In this case, the SoC 40*a* may change the path in the switching unit 50 (switch 56) in accordance with a switching request from the main system 10.

When the display unit 141-1 and the display unit 141-2 make up one display unit 140, the display unit 140 includes the display unit 141-1 (first display area) to display one of the output image data and the synthesized image data, and the display unit 141-2 (second display area) to directly receive the image data output from the main system 10 and display this image data.

Figure 9:
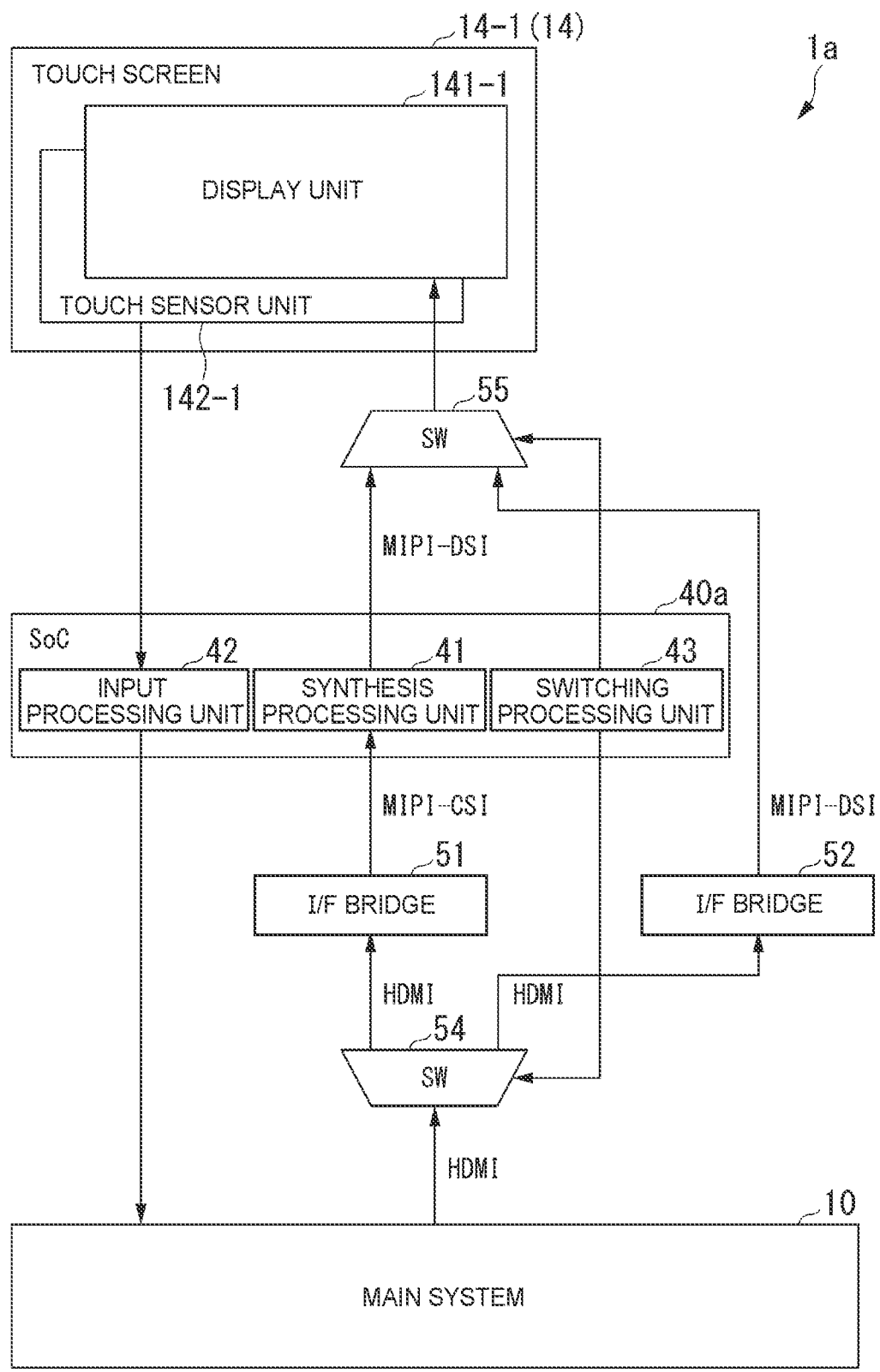
FIG. 9 is a block diagram illustrating one example of the functional configuration of the laptop PC according to the second embodiment.

Referring next to FIG. 9, the following describes the functional configuration of the laptop PC 1*a* according to the present embodiment.

FIG. 9 is a block diagram illustrating one example of the functional configuration of the laptop PC 1*a* according to the present embodiment.

As illustrated in FIG. 9, the laptop PC 1*a* includes the main system 10, the touch screen 14-1, the SoC 40*a*, the I/F bridge 51, the I/F bridge 52, the switch 54, and the switch 55. FIG. 9 illustrates only the major functional configuration of the laptop PC 1*a* that relates to the invention of the present embodiment. In FIG. 9, like numerals indicate like components in FIG. 3 as described above, and their description will be omitted.

In one example, the SoC 40*a* includes a synthesis processing unit 41, an input processing unit 42, and a switching processing unit 43.

The switching processing unit 43 controls various types of switching in the switching unit 50 described above. When the virtual input device is used (the display unit 141 displays the synthesized image data), the switching processing unit 43 changes the switch 54 to output data to the I/F bridge 51 and changes the switch 55 to receive the output from the SoC 40*a* and output it to the display unit 141-1.

When the virtual input device is not used (the display unit 141 displays the output image data), the switching processing unit 43 changes the switch 54 to output data to the I/F bridge 52 and changes the switch 55 to receive the output from the I/F bridge 52 and output it to the display unit 141-1.

Referring next to the drawing, the following describes the operation of the laptop PC 1*a* according to the present embodiment.

Figure 10:
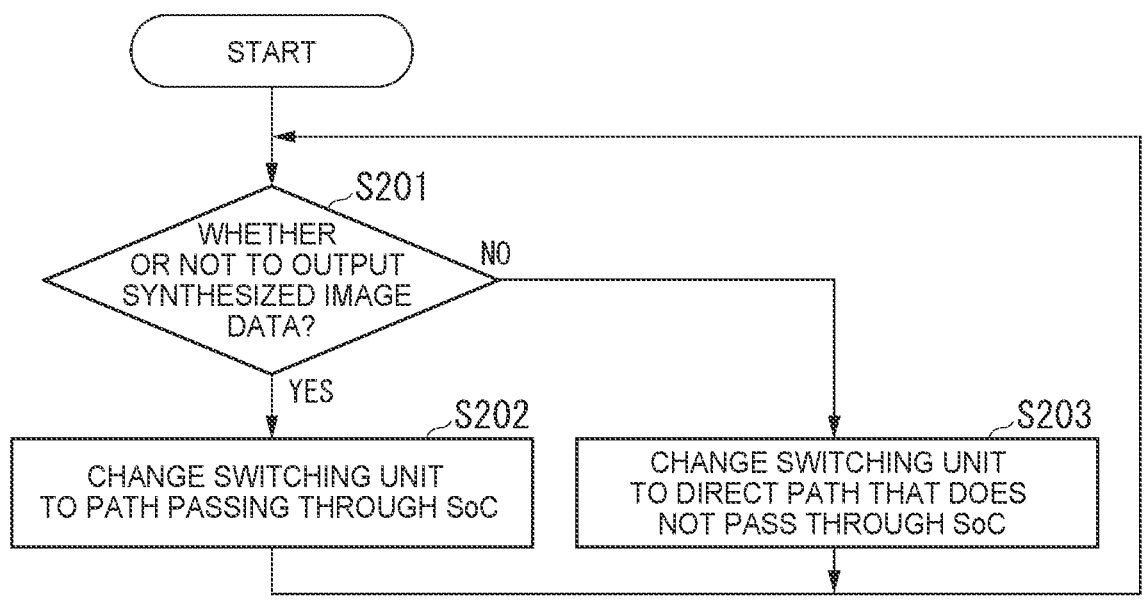
FIG. 10 is a flowchart illustrating an example of the switching by the SoC in the second embodiment.

FIG. 10 is a flowchart illustrating an example of the switching by the SoC 40*a* in the present embodiment.

As illustrated in FIG. 10, the switching processing unit 43 of the SoC 40*a* first determines whether or not the SoC 40*a* outputs synthesized image data (step S201). In one example, the synthesis processing unit 43 may determine whether or not the SoC 40*a* outputs the synthesized image data depending on whether the synthesis processing unit 41 has created the synthesized image data or not. When the SoC 40*a* outputs synthesized image data (virtual input device is used) (step S201: YES), the switching processing unit 43 progresses the procedure to step S202. When the SoC 40*a* does not output synthesized image data (virtual input device is not used) (step S201: NO), the switching processing unit 43 progresses the procedure to step S203.

In step S202, the switching processing unit 43 changes the path in the switching unit 50 to the path (second path) passing through the SoC 40*a*. That is, the switching processing unit 43 changes the switch 54 to output data to the I/F bridge 51, and changes the switch 55 to receive the output from the SoC 40*a* and output it to the display unit 141-1. After step S202, the switching processing unit 43 returns the procedure to step S201.

In step S203, the switching processing unit 43 changes the path in the switching unit 50 to the path (first path) that does not pass through the SoC 40*a*. That is, the switching processing unit 43 changes the switch 54 to output data to the I/F bridge 52, and changes the switch 55 to receive the output from the I/F bridge 52 and output it to the display unit 141-1. After step S203, the switching processing unit 43 returns the procedure to step S201.

The operation of the synthesis processing unit 41 and the input processing unit 42 in this embodiment is the same as that in the first embodiment described above, and the description thereon will be omitted here.

Referring next to FIGS. 11A-11D, the following describe variations of the display of the laptop PC 1*a* according to the present embodiment.

FIGS. 11A-11D illustrate modified examples of the image display pattern of the laptop PC 1*a* according to the present embodiment.

Figure 11A:
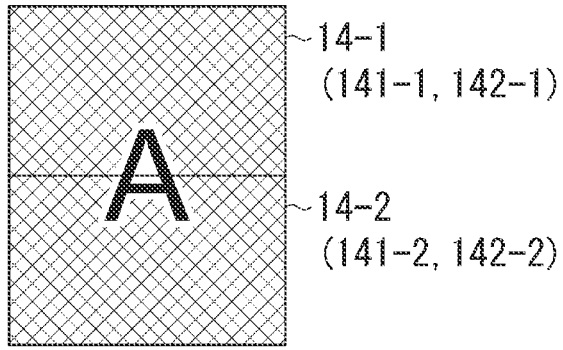
FIGS. 11A-D illustrate modified examples of the image display pattern of the laptop PC according to the second embodiment.

In the example of FIG. 11A, one image data is displayed on the display unit 141-1 and the display unit 141-2. In this case, the switching processing unit 43 of the SoC 40*a* controls the switching unit 50 to display one image with the display unit 141-1 and the display unit 141-2. In one example, the upper half of the one image data is output to the display unit 141-1, and the lower half of the image data is output to the display unit 141-2.

In this case, the main system 10 divides one image data in half, outputs one of the divided image data (for example, the image data of the upper half) to the switch 54, and outputs the other (for example, the image data of the lower half) to the I/F bridge 53. In one example, the switching processing unit 43 controls the switch 56 to receive the input from the switch 55.

Figure 11B:
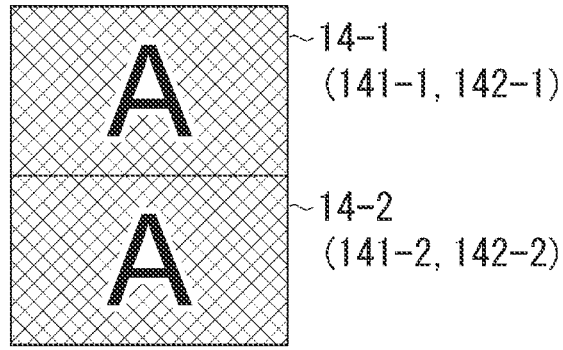

In the example of FIG. 11B, the display unit 141-1 and the display unit 141-2 display the same image data. In this case, the switching processing unit 43 controls the switching unit 50 to output the same image data to the display unit 141-1 and the display unit 141-2. That is, the switching processing unit 43 controls the switch 56 to receive the input from the I/F bridge 53.

Figure 11C:
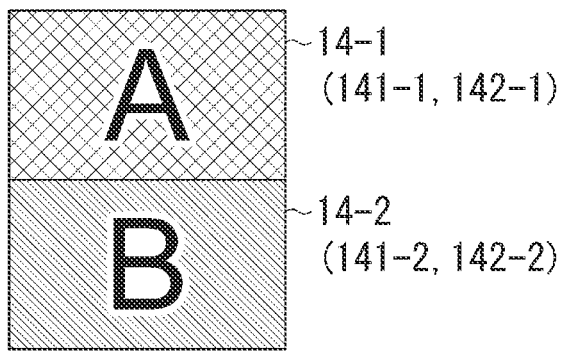

In the example of FIG. 11C, the display unit 141-1 and the display unit 141-2 display different image data. In this case, the switching processing unit 43 controls the switching unit 50 to output different image data to the display unit 141-1 and the display unit 141-2.

In this case, the main system 10 outputs two different image data to the switch 54 and the I/F bridge 53. That is, in one example, the main system 10 outputs image data ("A") to the switch 54, and outputs image data ("B") to the I/F bridge 53. The switching processing unit 43 controls the switch 56 to receive the input from the switch 55.

Figure 11D:
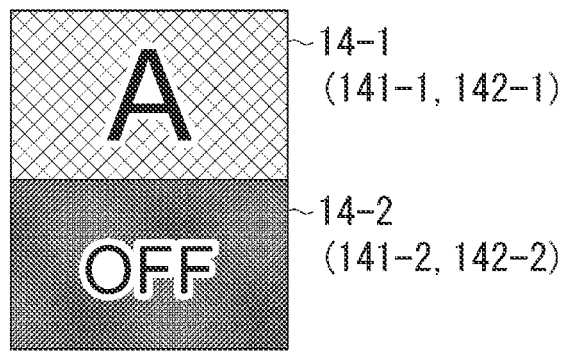

In the example of FIG. 11D, the display unit 141-1 displays image data and the display unit 141-2 does not display data. In this example, under the same control by the switching processing unit 43 as in the example of FIG. 11C as stated above, the main system 10 stops outputting of image data ("B") to the I/F bridge 53.

In this way, the laptop PC 1*a* according to the present embodiment enables various displays on the two display units 141 (141-1, 141-2), and allows the display unit 141-1 to display a unique virtual input device.

As described above, the laptop PC 1*a* according to the present embodiment includes the SoC 40*a* and the switching unit 50. In this way, the switching unit 50 changes the path between the first path that outputs the first image data from the main system 10 to the display unit 141-1 without passing through the SoC 40*a* and the second path that lets the output image data from the main system 10 pass through the SoC 40*a* and outputs the synthesized image data from the SoC 40*a* to the display unit 141-1. When the display unit 141-1 displays the synthesized image data, the SoC 40*a* controls the switching unit 50 to change the path from the first path to the second path. When the display unit 141-1 displays the output image data, the SoC 40*a* controls the switching unit 50 to change the path from the second path to the first path.

This allows the laptop PC 1*a* of the present embodiment to output the data to the display unit 141-1 without passing through the SoC 40*a* when the virtual input device is not used, and so reduces the influences from the processing delay at the SoC 40*a*. For example, in the case of the display example of FIG. 11A described above, the laptop PC 1*a* according to the present embodiment reduces user's sense of discomfort for display, which results from a difference in display timing between the display unit 141-1 and the display unit 141-2.

The display unit 140 in the present embodiment includes the display unit 141-1 (first display area) to display one of the output image data and the synthesized image data, and the display unit 141-2 (second display area) to directly receive the image data output from the main system 10 and display this image data.

This allows the laptop PC 1a according to the present embodiment to flexibly display various image data using the two display areas (the display unit 141-1 and the display unit 141-2).

The present invention is not limited to the above-described embodiments, and can be modified without deviating from the scope of the present invention.

The above embodiments describe the example where the information processing apparatus is the laptop PC 1 (1a). In another example, the information processing apparatus may be another information processing apparatus such as a tablet terminal or a desktop PC.

The above embodiments describe the example where the SoC 40 (40a) acquires image data with MIPI-CSI and outputs the image data with MIPI-DSI. In another example, the SoC 40 (40a) may use other interfaces for acquisition and output of the data.

The above embodiments describe the example where the main system 10 outputs image data with HDMI (registered trademark). In another example, the main controller 10 may use other interfaces such as USB and DisplayPort. The laptop PC 1 (1a) may not include the I/F bridges 51 to 53 depending on the interface used.

The above embodiments describe the example where the SoC 40 (40a) outputs input information of the virtual input device to the embedded controller 31. In another example, the SoC 40 (40a) may output the data to the chipset 21 with a USB interface.

The above second embodiment describes the example where the display unit 140 is divided into two display areas (display unit 141-1 and display unit 141-2) for use, or where the laptop PC 1a includes the two display units 141 (141-1 and 141-2). In another example, the display unit 140 may be divided into three display areas for use, or where the laptop PC 1a includes three or more display units 141.

The above embodiments describe the input device for handwrite inputting as one example of the virtual input device. In another example, the virtual input device may be a software keyboard, a pointing device, or the like.

The method for creating synthesized image data by the synthesis processing unit 41 is not limited to the method described in the above embodiments. Another method may be used, and in one example, the synthesis processing unit 41 may synthesize transparent input image data over the output image data.

The above-stated configurations of the laptop PC 1 (1a) internally include a computer system. A program to implement the functions of various configurations of the laptop PC 1 (1a) as stated above may be stored in a computer-readable recording medium, and the processing at the various configurations of the laptop PC 1 (1a) may be performed by causing the computer system to read and execute the program stored in this recording medium. "Causing the computer system to read and execute the program stored in the recording medium" includes installing of such a program in the computer system. The "computer system" in this case includes an OS and hardware such as peripherals.

The "computer system" may include one or more computer devices connected via a network, including the internet and communication lines such as WAN, LAN and dedicated lines. The "computer-readable recording medium" is a portable medium such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the laptop PC 1 (1a). Alternatively, different distribution servers may distribute these divided pieces of program. The "computer-readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions as stated above may be implemented as an integrated circuit, such as a LSI (large scale integration). Each of the functions as stated above may be implemented as one processor, or a part or all of the functions may be implemented as one processor in an integrated manner. A technique for integrated circuit is not limited to a LSI, and an integrated circuit may be manufactured using a dedicated circuit or a general-purpose processor. If a technique for integrated circuit that replaces LSIs becomes available with the development of semiconductor techniques, an integrated circuit based on such a technique may be used.

DESCRIPTION OF SYMBOLS 1, 1a Laptop PC
10 Main system
11 CPU
12 Main memory
13 Video subsystem
14, 14-1, 14-2 Touch screen
21 Chipset
22 BIOS memory
23 HDD
24 Audio system
25 WLAN card
26 USB connector
27 Imaging unit
31 Embedded controller (EC)
32 Input unit
33 Power circuit
40, 40a SoC
41 Synthesis processing unit
42 Input processing unit
43 Switching processing unit
50 Switching unit
51, 52, 53 I/F bridge
54, 55, 56 Switch
140, 141, 141-1, 141-2 Display unit
142, 142-1, 142-2 Touch sensor unit Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
a display;
a touch sensor on the display that detects a contact with an object on the display;
a main system that executes processing in accordance with an operating system (OS); and
an embedded system different from and independent of the main system, wherein
the embedded system causes the display to:
  display third image data obtained by synthesizing first image data output from the main system and second image data that is image data in an input area for a virtual input device, and
  output input information based on detection information detected by the touch sensor in the input area to the main system as input information accepted by the virtual input device.

2. The information processing apparatus according to claim 1, wherein the embedded system synthesizes the second image data with the first image data by overlaying the second image in a partial area of the first image to create the third image data.

3. The information processing apparatus according to claim 1, wherein the embedded system synthesizes the first image data with the second image data by overlaying the first image in a partial area of the second image to create the third image data.

4. The information processing apparatus according to claim 1, wherein when the touch sensor receives a predetermined operation, the embedded system changes the display from a state of displaying the first image data to a state of displaying the third image data.

5. The information processing apparatus according to claim 1, wherein the display includes:
a first display area to display one of the first image data and the third image data and
a second display area to directly receive image data output from the main system and display the received image data.

6. The information processing apparatus according to claim 1, further comprising:
a switch that changes a path between a first path that outputs the first image data from the main system to the display without passing through the embedded system and a second path that lets the first image data from the main system pass through the embedded system and outputs the third image data from the embedded system to the display, wherein
the embedded system controls the switch to change the path from the first path to the second path to cause the display to display the third image data.

7. The information processing apparatus according to claim 1, wherein when a distance between color of the first image data and color of the second image data in a color space is within a predetermined threshold, the embedded system changes the color of the second image data to create the third image data so that the second image data becomes visible.

8. A method for controlling, by an embedded system of an information processing apparatus that includes a display, a touch sensor on the display that detects a contact with an object on the display, a main system that executes processing in accordance with an operating system (OS), and the embedded system that is different from and independent of the main system, the method comprising:
displaying third image data obtained by synthesizing first image data output from the main system and second image data that is image data in an input area for a virtual input device on the display; and
outputting input information based on detection information detected by the touch sensor in the input area to the main system as input information accepted by the virtual input device.

* * * * *